United States Patent [19]

Claussen

[11] Patent Number: 5,023,456
[45] Date of Patent: Jun. 11, 1991

[54] RADIATION DETECTOR SYSTEM

[75] Inventor: Lennart Claussen, Karlskoga, Sweden

[73] Assignee: Aktiebolaget Sefors, Karlskoga, Sweden

[21] Appl. No.: 460,889

[22] PCT Filed: Jun. 9, 1989

[86] PCT No.: PCT/SE89/00328
§ 371 Date: Feb. 13, 1990
§ 102(e) Date: Feb. 13, 1990

[87] PCT Pub. No.: WO89/12807
PCT Pub. Date: Dec. 28, 1989

[30] Foreign Application Priority Data

Jun. 13, 1988 [SE] Sweden .................................. 8802197

[51] Int. Cl.$^5$ ............................. G01J 1/44; G01T 1/18
[52] U.S. Cl. ..................................... 250/374; 250/372; 250/388

[58] Field of Search ........................ 250/388, 372, 374

[56] References Cited

U.S. PATENT DOCUMENTS

| | | |
|---|---|---|
| 2,993,995 | 7/1961 | Pinackaers. |
| 3,336,479 | 8/1967 | Blackett .............................. 250/374 |
| 4,047,038 | 9/1977 | Kompelien .......................... 250/372 |
| 4,162,425 | 7/1979 | Larsen et al. ....................... 250/372 |
| 4,453,076 | 6/1984 | Jackson et al. ..................... 250/374 |

Primary Examiner—Carolyn E. Fields
Attorney, Agent, or Firm—Pollock, Vande Sande & Priddy

[57] ABSTRACT

A flame and radiation detector system is provided with programmable logic to read the detector and control the detector voltage supply in order to make possible a high counting rate. This makes the radiation detecting system fast and reliable by increasing the signal to noise ratio.

16 Claims, 2 Drawing Sheets

RADIATION DETECTOR SYSTEM

DESCRIPTION

BACKGROUND OF THE INVENTION

The use of gas-filled Geiger Mueller tubes for radiation detection is well known. In operating condition when no incoming radiation is present, the tube is not conducting. At incoming radiation the tube starts to conduct and continues to do so even if the radiation disappears. The current is producing ions and free electrons in the gas. To stop the current from flowing, the applied voltage over the tube must be reduced under a certain treshold value, the quenching voltage. This is obtained two times every cycle at AC excitation and with passive or active circuitry at DC excitation. The voltage reduction must be of sufficient time to get the free electrons and the ions neutralized. If normal operating voltage is applied too soon over the electrodes after the discharge has been stopped, the tube will start to conduct again, even if there is no incoming radiation. The most used quenching circuit for DC operation is of a passive CR type, often used by tube manufacturers in datasheets to specify the sensitivity of the tube. FIG. 1 shows a diagram of this CR quenching circuit and FIG. 2 exemplifies the voltage over and the current flowing through the tube.

These type of tubes are frequently used as primary detectors in systems made for radiation detection, where radiation normally is not present. The systems shall indicate when the radiation increases to a level or with a rate that require some action, for example monitoring nuclear leakage or radiation from a fire. False triggering is not acceptable in such systems.

At no incoming radiation, from the source that is intended to be surveyed, spurious discharges can occur from stray photons, beta or gamma rays, static discharges, inpurities in cathode material and the like. This is noise to the system. The discharge pulses from this background noise are distributed at random time. Therefor it is possible to have a number of pulses within a short time even at very low mean pulse rate. For example, at a mean pulse rate of one pulse per minute, the probability of having three pulses in one second is one in 15 days, and the probability of having 5 pulses in one second is one in 3000 years. This is the reason why no known systems are allowed to react for just a few pulses. If you should maintain a good margin against false triggering, most systems require at least 5 to 10 pulses under a limited time to take action. The pulse rate increases for increasing incoming radiation up to a saturation pulse rate of about 170 Hz for an ordinary ultra violet detector tube with CR quenching circuits. This gives a low limit time of 5/170 s (29 ms) to the ultra violet flame detecting system with the CR system described above, at high radiation levels. The invention has means to have a pulse rate of 1700 Hz which gives a low limit radiation detecting time of 3 ms. U.S. Pat. No. 4,162,425 discloses have a modification of the CR quenching circuit which increases the saturation pulse rate with less than two times.

SUMMARY OF THE INVENTION

The present invention relates to a detector system which can discriminate continious high level signal radiation from spurious stray radiation faster than any other known system on the market today. This invention makes it possible to discriminate high radiation levels in less time than 3 ms without increased false triggering from multiple spurious noise discharges.

DESCRIPTION OF THE PREFERED EMBODIMENT

This description is related to a flame detecting system with an UV detecting tube. Detector tubes for other types of radiation will have different timing data due to different material and physical arrangement, but the invention will increase the saturation pulse counting rate in the same way for these tubes as for the UV-tubes.

Figure 1:
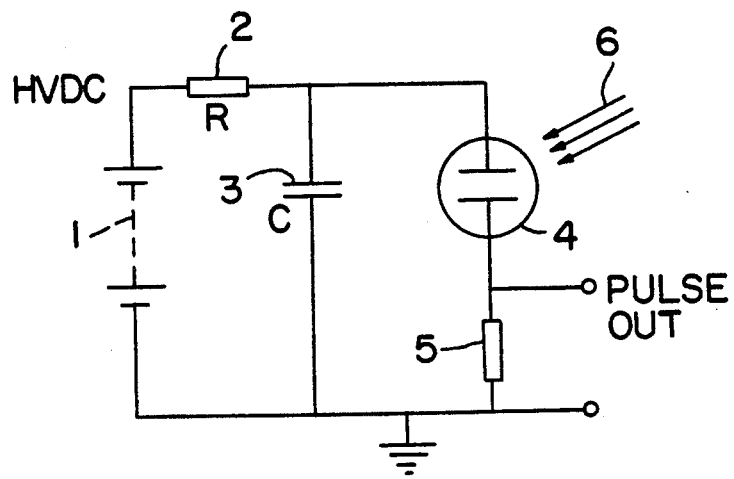
FIG. 1 is a diagram of the CR quenching circuit, frequently recommended by the manufacturers
Figure 2:
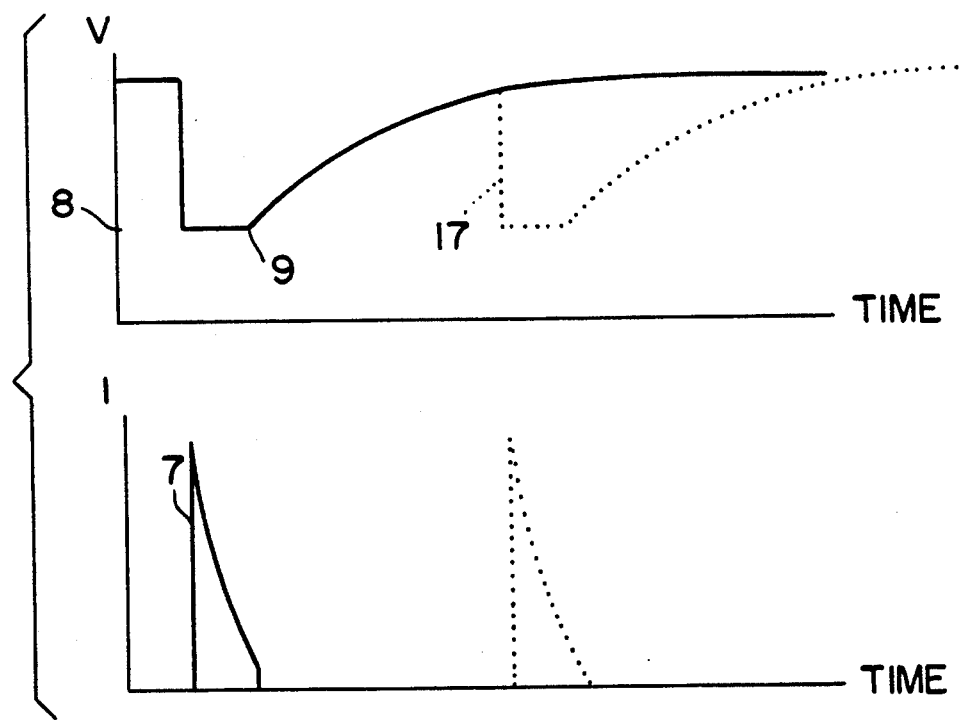
FIG. 2 is a representative plot of the voltage over and current through the tube during a typical operation cycle of this CR quenching circuit.
Figure 3:
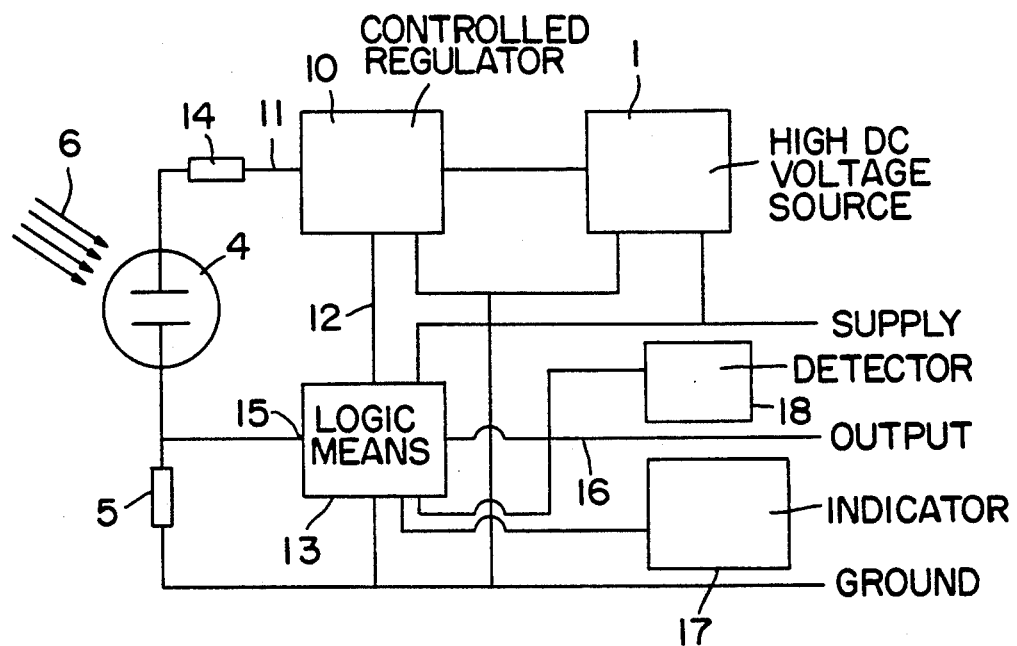
FIG. 3 is a block diagram showing one of the present invention.
Figure 4:
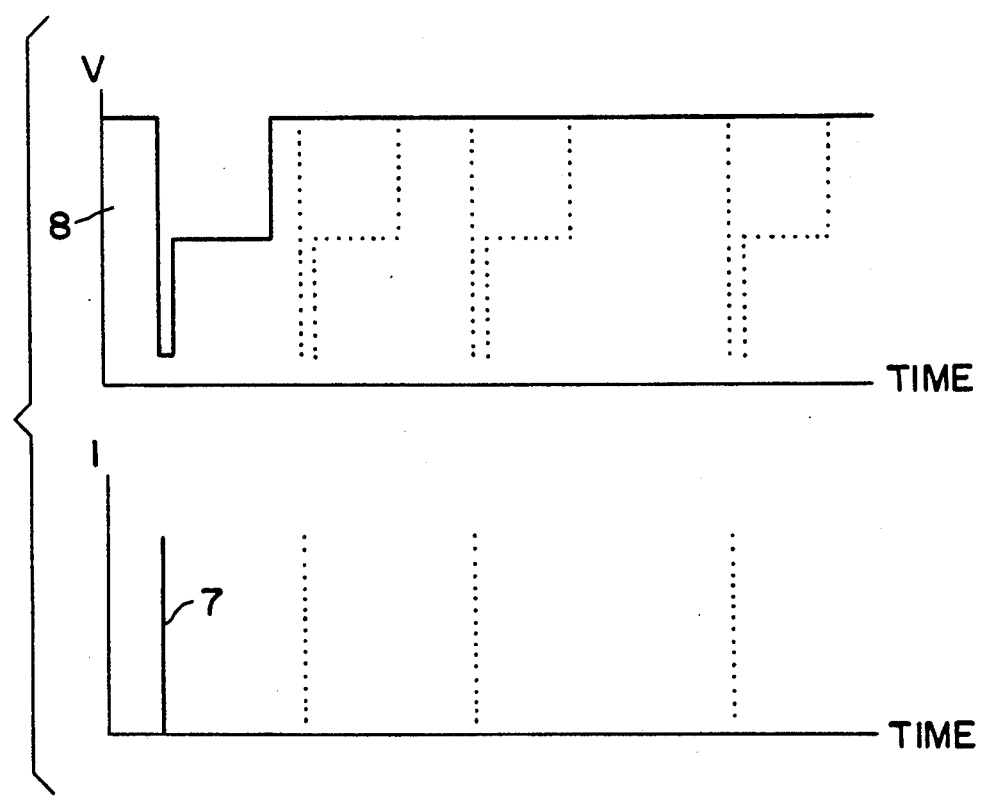
FIG. 4 shows the invention in a representative plot of the voltage over and current through the tube during a typical cycle of operation.

In the block diagram of FIG. 3, the voltage delivered from the high voltage DC source 1 is higher or equal to the manufacturers recommended working voltage of the tube 4. Normal voltage values are in the range of 300 V to 600 V. The controlled regulator 10 regulates the voltage 11 to the tube 4 to a value coded on the control line 12 by the logic means 13. If the tube 4 is subjected to radiation 6, with a wavelength within the spectral range of the tube, it will start to conduct. The current is limited by the sum of resistors 5 and 14. The limited current over resistor 5 makes a voltage higher than the treshold value of the logic means input 15. The logic 13 then immediately commands the controlled regulator 10 to reduce the voltage over the tube 4 to a low value where the current through the tube stops. After some tenths of microseconds the logic means 13 commands the regulator 10 to set a voltage, preferably in the range of 100 to 200 V DC. After some hundreds of microseconds in this position the logic means 13 orders the regulator 10 to set normal operating voltage over the tube 4 again. This described sequence will take less than 300 microseconds and gives a pulse counting rate, at high radiation levels of near 2000 Hz. Detector systems known on the market to-day have a maximum counting rate of about 200 Hz. The improvement is achieved by two actions:

1. The immediate voltage cut off over the tube after the discharge prevents the build up of ions and electrons in the gas. For that reason the ions and electrons to be neutralized are minimized.

2. A voltage higher than the quenching voltage and lower than the normal operating voltage, creating an electric field between the electrodes of the tube is applied over the tube. This is possible with the limited number of ions and electrons resulting from the first action. The electric field accelerates the ions and electrons to the electrodes and makes the gas free from these particles in less time than in systems with no such field applied or for that matter a field created from a DC quenching circuit. Prior art systems are waiting at least 2 ms with no voltage or low voltage between the electrodes before the thermal motion of the ions and electrons have brought these particles to the electrodes for neutralization.

The logic means 13 of the present invention can be implemented with a standard logic family as complementary mos (CMOS) or transistor-transistor-logic (TTL) or a programmable logic array or a microcontroller or a microprocessor or a custom designed circuit. The logic model of the function can be entered into a computer aided design system which can produce design documents for any of these choices. The logic means 13 count the discharges through the tube and records the time for incoming pulses at input 15 and tests the recorded data against an algorithm, implemented in the logic means 13, that is adopted for the actual surveillance application, and then the logic means 13 sets the output signal 16 for action when the requirements of the algorithm are fulfilled. In addition to data from discharges through the tube, also data from another detector 18 may be used by logic means 13 to give an output signal 16 indicating presence of radiation. Such applications can be from explosion detection in an high risk environment to a low intensity early warning radiation detection in a public environment. Different algorithms can be used to make different hardware or many algorithms can be programmed within the same hardware or an adaptive model can be implemented, all these obvious to those skilled in the art of digital design and programming. The signal from this device can further be combined with other sensors to obtain even higher selectivity. The logic means 13 can even handle other functions, such as controlling visual indicators 17 at the detector location. A system based on the invention can preferably be used together with U.S. Pat. Nos. 4,281,718 and 4,359,097 and 4,410,882.

I claim:

1. A radiation detecting system comprising:
   a. a radiation sensitive gas tube for receiving radiation;
   b. means for supplying at least three different direct current voltages to said tube, first a high voltage to provide ionization to the gas when the tube receives radiation and second a low or zero voltage to stop the self-regenerating discharge started by the radiation and third a medium voltage or voltages to accelerate the remaining ions and electrons to the electrodes of the tube for neutralization;
   c. logic means for selecting any one of said direct current voltages;
   d. means for sensing the current flow through said tube for supplying input data to said logic means.

2. The apparatus as claimed in claim 1 wherein said logic means counts the discharges through said tube, which constitutes said input data.

3. The apparatus as claimed in claim 1 wherein said logic means measures the time between discharges through said tube.

4. The apparatus as claimed in claim 1 wherein said logic means counts the discharges through said tube and measures the time between discharges through said tube.

5. The apparatus as claimed in claim 1, wherein means are provided for supplying input data from discharges through said tube to said logic means which are recorded and used by said logic means to decide whether to give an output signal indicating the presence of radiation.

6. The apparatus as claimed in claim 5, wherein means are provided for supplying input data from another detector to said logic means, in addition to data from discharges through said tube which are recorded and used by said logic means to decide whether to give an output signal indicating the presence of radiation.

7. The apparatus as claimed in claim 1, further comprising visible indicators controlled by said logic means showing the operation mode or radiation levels.

8. The apparatus as claimed in claim 3 wherein means are provided for supplying data from discharges through said tube to said logic means which are used by said logic means to decide whether to give an output signal indicating the presence of radiation.

9. The apparatus as claimed in claim 4 wherein means are provided for supplying data from discharges through said tube to said logic means which are used by said logic means to decide whether to give an output signal indicating the presence of radiation.

10. The apparatus as claimed in claim 3 wherein means are provided for supplying data from another detector to said logic means, in addition to data from discharges through said tube which are used by said logic means to decide whether to give an output signal indicating the presence of radiation.

11. The apparatus as claimed in claim 4 wherein means are provided for supplying data from another detector to said logic means, in addition to data from discharges through said tube which are used by said logic means to decide whether to give an output signal indicating the presence of radiation.

12. The apparatus as claimed in claim 2, further comprising visible indicators controlled by said logic means to show the operating mode or radiation levels.

13. The apparatus as claimed in claim 3, further comprising visible indicators controlled by said logic means to show the operating mode or radiation levels.

14. The apparatus as claimed in claim 4, further comprising visible indicators controlled by said logic means to show the operating mode or radiation levels.

15. The apparatus as claimed in claim 5, further comprising visible indicators controlled by said logic means to show the operating mode or radiation levels.

16. The apparatus as claimed in claim 6, further comprising visible indicators controlled by said logic means to show the operating mode or radiation levels.

* * * * *